United States Patent
Mazurczyk et al.

(10) Patent No.: US 7,398,023 B2
(45) Date of Patent: Jul. 8, 2008

(54) METHOD AND APPARATUS FOR BIAS AND ALIGNMENT CONTROL IN AN OPTICAL SIGNAL TRANSMITTER

(75) Inventors: Matthew V. Mazurczyk, Red Bank, NJ (US); Sameh Sabet, Freehold, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 552 days.

(21) Appl. No.: 11/012,369

(22) Filed: Dec. 15, 2004

(65) Prior Publication Data
US 2006/0127103 A1 Jun. 15, 2006

(51) Int. Cl.
*H04B 10/04* (2006.01)

(52) U.S. Cl. .................... 398/198; 398/182; 398/183; 398/184; 398/185; 398/186; 398/187; 398/188; 398/189; 398/192; 398/193; 398/194; 398/195; 398/196; 398/197; 398/199; 398/200; 398/201; 398/33; 398/38; 398/93; 398/94; 398/95; 372/32; 372/34; 372/36; 372/38; 372/50

(58) Field of Classification Search ................ 398/182, 398/183, 184, 185, 186, 187, 188, 189, 192, 398/193, 194, 195, 196, 197, 198, 199, 200, 398/201, 33, 38, 93, 94, 95; 372/32, 34, 372/36, 38, 50
See application file for complete search history.

(56) References Cited

U.S. PATENT DOCUMENTS

| | | | |
|---|---|---|---|
| 6,865,348 B2 * | 3/2005 | Miyamoto et al. | 398/183 |
| 6,952,534 B1 | 10/2005 | Sikora | |
| 6,972,842 B2 | 12/2005 | Doerr et al. | |
| 2003/0175037 A1 * | 9/2003 | Kimmitt et al. | 398/198 |

OTHER PUBLICATIONS

Miyazaki, et al., "LiNbO3 Optical Intensity Modulator Packaged with Monitor Photdiode" IEEE Photonics Technology Letters, vol. 13, No. 5, May 2001.
International Search Report dated Sep. 14, 2006 received in corresponding International Patent Application Serial No. PCT/US05/45215 (8 pages).

* cited by examiner

*Primary Examiner*—Hanh Phan
(74) *Attorney, Agent, or Firm*—Grossman, Tucker, Perreault & Pfleger, PLLC (57) ABSTRACT

A method and apparatus for controlling bias and alignment in an optical signal transmitter for providing intensity modulation and DPSK modulation to an optical signal, e.g. in an RZ-DPSK modulation format. Output power in dither signals applied to the bias signals may be detected by a low speed photodetector. One or more of the bias signals may be adjusted in a low speed control loop in response to an error signal obtained by mixing the detected signal with the low frequency dither signals.

42 Claims, 7 Drawing Sheets

METHOD AND APPARATUS FOR BIAS AND ALIGNMENT CONTROL IN AN OPTICAL SIGNAL TRANSMITTER

TECHNICAL FIELD

The present application relates to the optical transmission of information and, more particularly, to a method and apparatus for bias and alignment control in an optical signal transmitter.

BACKGROUND

Very long optical fiber transmission paths, such as those employed in undersea or transcontinental terrestrial lightwave transmission systems, are subject to decreased performance due to a host of impairments that accumulate along the length of the optical fiber in the transmission path. The source of these impairments within a single data channel includes amplified spontaneous emission (ASE) noise generated in Erbium-Doped Fiber-Amplifiers (EDFAs), nonlinear effects caused by dependence of the single-mode fiber's index on the intensity of the light propagating through it, and chromatic dispersion which causes different optical frequencies to travel at different group velocities. In addition, for wavelength division multiplexed (WDM) systems, where several optical channels are on the same fiber, crosstalk between channels caused by the fiber's nonlinear index can be problematic.

Distortions of the received waveform are influenced by design of the transmission line, as well as the shape of the transmitted pulses. Known long-haul systems have been implemented using On-Off-Keying (OOK), wherein the transmitted pulse is turned on and off with the ones and zeros of a data bit stream. On-Off-Keying may be implemented in a variety of well-known formats, such as Return-to-Zero (RZ), Non-Return to Zero (NRZ) and Chirped-Return-to-Zero (CRZ) formats. Generally, in a RZ format the transmitted optical pulses do not occupy the entire bit period and return to zero between adjacent bits, whereas in a NRZ format the optical pulses have a constant value characteristic when consecutive binary ones are sent. In a chirped format, such as CRZ, a bit synchronous sinusoidal phase modulation is imparted to the transmitted pulses.

Phase Shift Keying (PSK) is another modulation method known to those of ordinary skill in the art. In PSK modulation ones and zeros are identified by phase differences or transitions in the optical carrier. PSK may be implemented by turning the transmitter on with a first phase to indicate a one and then with a second phase to indicate a zero. In a differential phase-shift-keying (DPSK) format, the optical intensity of the signal may be held constant, while ones and zeros are indicated by differential phase transitions. DPSK modulation formats include RZ-DPSK, wherein a return-to-zero amplitude modulation is imparted to a DPSK signal, and CRZ-DPSK.

It has been recognized that the RZ-DPSK modulation format has particular advantages over other formats in WDM long-haul optical systems. For example, compared to OOK, RZ-DPSK modulation provides a significant reduction in the required optical signal-to-noise (OSNR) for a particular bit error rate (BER). As such, systems for imparting a RZ-DPSK modulation to WDM optical signals have been developed.

A RZ-DPSK modulation may be applied to a signal by imparting a periodic RZ intensity modulation to a continuous wave optical signal, and then imparting a NRZ DPSK data modulation to the intensity modulated signal. The order of the RZ and DPSK modulation may be reversed. Those of ordinary skill in the art will recognize that the RZ intensity modulator and the NRZ DPSK data modulator may be Mach-Zehnder-type optical modulators. Known two-stage Mach-Zehnder type optical modulators conduct modulation in a two-staged manner through serially connected Mach-Zehnder type optical modulators disposed on a single substrate, such as lithium niobate (LN). RZ-DPSK modulation may be generated by selecting appropriate driving voltages and bias points for the serially connected Mach-Zehnder modulators.

Stable and accurate setting of the Mach-Zehnder bias points is necessary to achieve a RZ-DPSK modulated signal that results in optimal system BER. In a RZ-DPSK signal, the modulator imparting the RZ modulation may be biased at the peak of the modulator transfer function, and the modulator imparting the NRZ DPSK modulation may be biased at the null of the transfer function. However, factors including temperature and aging can cause the modulator transfer function to vary, thereby modifying the bias point necessary to achieve optimum performance. Bias control loops have been developed in an attempt to ensure accurate modulator biasing. Known bias control loop configurations have, however, incorporated expensive and/or inefficient configurations.

In addition, optimum performance requires stable and accurate relative alignment between the RZ modulator and the NRZ DPSK modulator. Optimally, the peak amplitude point of the RZ modulation is aligned with the center of the data bits modulated on the signal by the NRZ DPSK modulator. The alignment may be achieved by delaying the RZ modulation relative to the DPSK modulation using an electrical phase shifter/delay circuit coupled to the RZ modulator's drive signal. The optimal setting of the phase shifter to achieve proper alignment can also vary with temperature and aging. In an attempt to address this problem, transmitters have been configured with predetermined alignment settings for various temperatures. This solution, however, requires a complicated and time consuming factory calibration procedure, and does not account for drift in clock-data alignment associated with aging or modulator operating point changes.

There is therefore a need for a system and method for efficiently and reliably controlling the modulator bias points and timing alignment in a RZ-DPSK transmitter.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
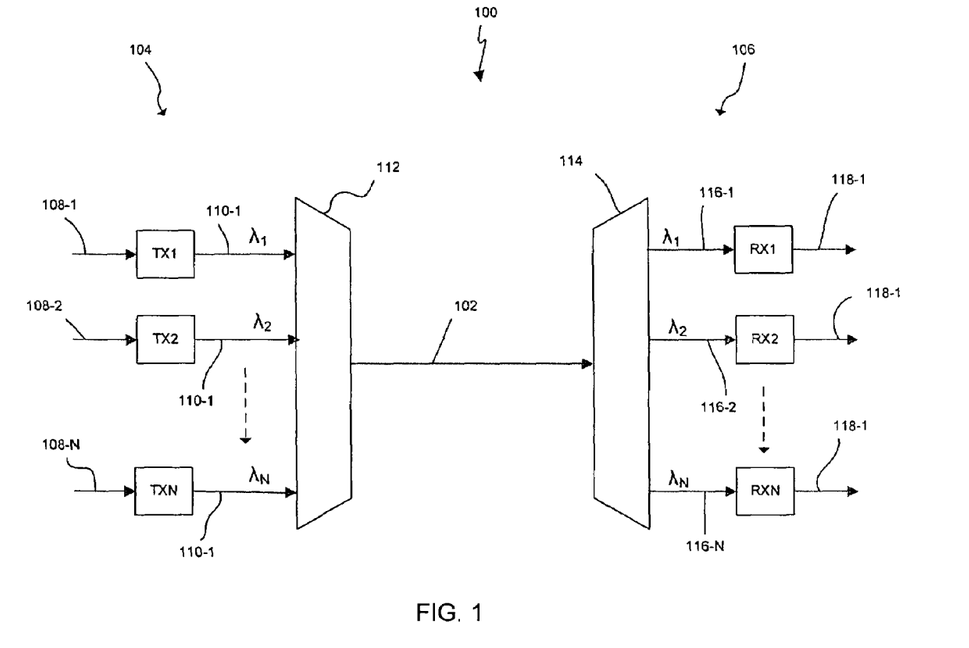
FIG. 1 is a simplified block diagram of one exemplary embodiment of a system consistent with the present invention.

FIG. 1 is a simplified block diagram of one exemplary embodiment of a WDM transmission system 100 consistent with the present invention. The transmission system serves to transmit a plurality of optical channels over an optical information path 102 from a transmitting terminal 104 to one or more remotely located receiving terminals 106. Those skilled in the art will recognize that the system 100 has been depicted as a highly simplified point-to-point system form for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the invention may be incorporated into a wide variety of network components and configurations. The illustrated exemplary embodiments herein are provided only by way of explanation, not of limitation.

In the illustrated exemplary embodiment, each of a plurality of transmitters TX1, TX2 . . . TXN receives a data signal on an associated input port 108-1, 108-2 . . . 108-N, and transmits the data signal on associated wavelength $\lambda_1, \lambda_2 \ldots \lambda_N$. One or more of the transmitters TX1, TX2 . . . TXN may be configured to modulate data on the associated wavelength with a RZ-DPSK modulation format while providing bias and/or alignment control in a manner consistent with the present invention. The transmitters, of course, are shown in highly simplified form for ease of explanation. Those skilled in the art will recognize that each transmitter may include electrical and optical components configured for transmitting the data signal at its associated wavelength with a desired amplitude and modulation.

The transmitted wavelengths or channels are respectively carried on a plurality of paths 110-1, 110-2 . . . 110-N. The data channels are combined into an aggregate signal on optical information channel 102 by a multiplexer or combiner 112. The optical information channel 102 may include optical fiber waveguides, optical amplifiers, optical filters, dispersion compensating modules, and other active and passive components.

The aggregate signal may be received at one or more remote receiving terminals 106. A demultiplexer 114 separates the transmitted channels at wavelengths $\lambda_1, \lambda_2 \ldots \lambda_N$ onto associated paths 116-1, 116-2 . . . 116-N coupled to associated receivers RX1, RX2 . . . RXN. One or more of the receivers RX1, RX2 . . . RXN may be configured to demodulate a RZ-DPSK modulated signal and provide an associated output data signal on an associated output path 118-1, 118-2, 118-3, 118-N.

Figure 2:
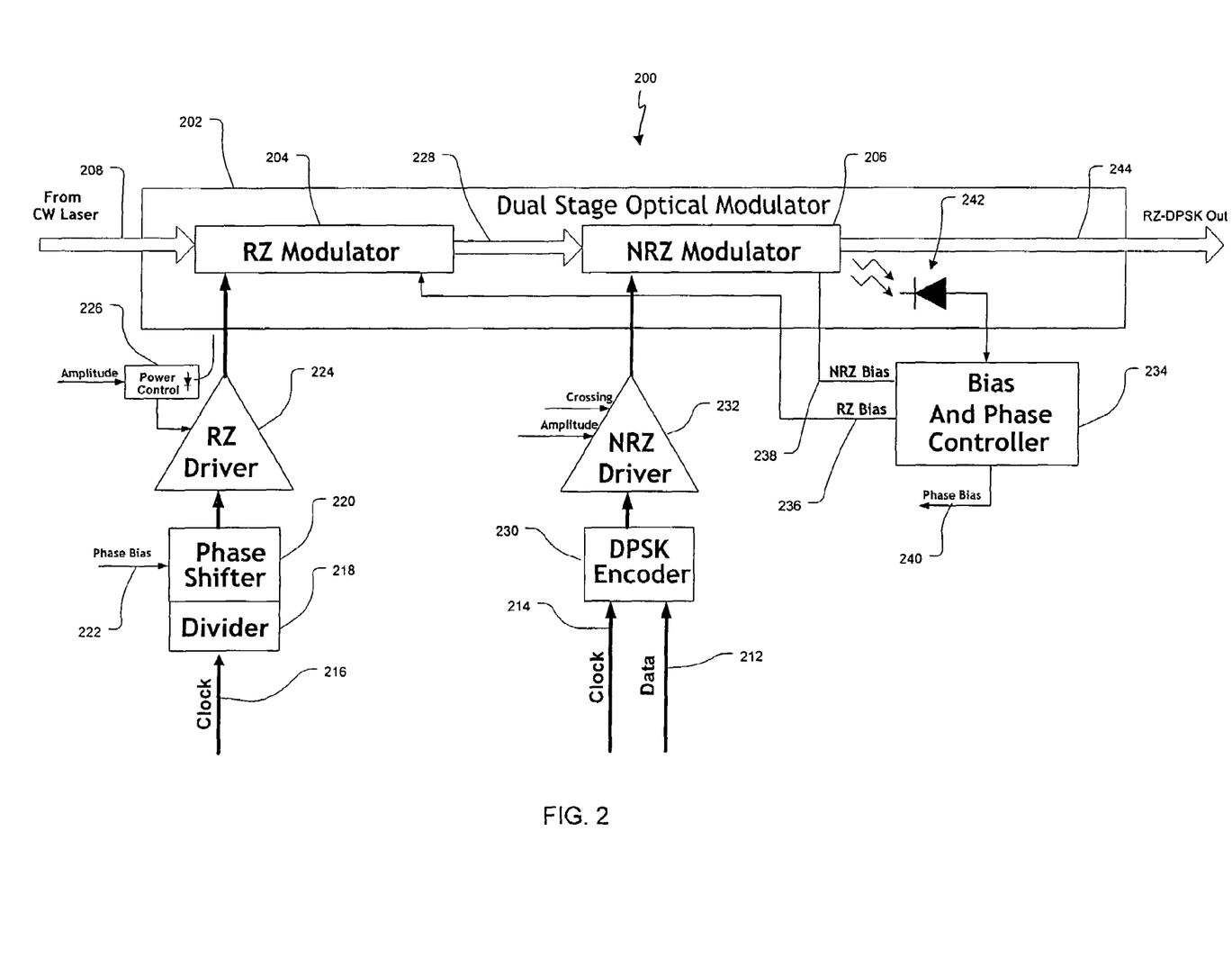
FIG. 2 is a simplified block diagram of one exemplary embodiment of a system consistent with the present invention.

Turning to FIG. 2, there is illustrated an exemplary transmitter 200 consistent with the present invention. The illustrated exemplary embodiment includes a dual-stage optical modulator 202, e.g. an LN modulator, including an RZ Mach-Zehnder type modulator 204 for imparting a periodic RZ intensity modulation and a NRZ Mach-Zehnder type modulator 206 for imparting an NRZ (DPSK) modulation to the intensity modulated signal. The two-stage modulator 202 may be driven in a known manner to modulate data onto a continuous wave optical signal 208, e.g. from a laser source, with a RZ-DPSK modulation format.

For example, the RZ modulator 204 may be driven in a well-known manner by the data clock to impart a periodic intensity modulation to the CW optical signal 208. As shown, the data clock may be provided to a known divider 218 which provides an output including a train of identical sinusoidal pulses at half the data clock frequency. In one exemplary embodiment, the divider may receive a 12 GHz data clock signal and output a 6 GHz drive signal.

The output of the divider 218 may be provided to a known electrical phase shifter/delay circuit 220. The phase shifter 220 may be configured to impart a timing delay to the output of the divider 218 for purposes of adjusting the alignment of the RZ modulation to the NRZ (DPSK) data modulation. Optimal performance is achieved when the peak amplitude point of the RZ modulation is aligned with the center of the data bits modulated on the signal by the NRZ (DPSK) modulator 206. The timing delay imparted by the phase shifter may be controlled by a Phase bias 222 input to the phase shifter 220.

The output of the phase shifter 220 may be coupled to an RF driver 224 for driving the RZ modulator 204. The nonlinear switching characteristic of the RZ modulator 204 doubles the frequency of the electrical drive signal from the RF driver 224, as is well known in the art, to impart the periodic intensity modulation to the optical signal at a frequency equal t6 the data rate. The intensity modulated signal 228 is provided at an output of the RZ modulator 204. A power control mechanism 226 may be coupled to the RF driver 224. The power control mechanism may be configured to adjust the intensity modulation depth imparted to optical information signal 208. The depth of modulation imparted by the RZ modulator 204 may be controlled by an amplitude control signal provided to the power control mechanism 226. In an RZ-DPSK format the modulation depth may be set to 100%. Periodic intensity modulation may, however, be imparted to the CW optical signal 208 at other modulation depths, as described, for example in U.S. Pat. No. 6,556,326 (the '326 patent) to Neal S. Bergano, the teachings of which are incorporated herein by reference.

The NRZ modulator 206 may be driven to impart a DPSK modulation to the intensity modulated optical signal 228 in a well-known manner. As shown, for example, a data stream and clock may be coupled to a known DPSK encoder 230. The output of the DPSK encoder 230 may be provided to an RF driver 232. The RF driver 232 may drive the NRZ modulator 206 in response to the DPSK encoder 230 output to modulate the phase of the intensity modulated optical signal 228 in accordance with a DPSK modulation format, i.e. with ones and zeros indicated by differential phase transitions in the optical signal. The output 244 of the NRZ modulator 206 is provided as the modulator 202 output and is a RZ-DPSK formatted optical signal. The modulation amplitude and the phase transition crossing point associated with the NRZ modulator may be adjusted using amplitude and crossing inputs to the RF driver 232.

Those of ordinary skill in the art will recognize that stable and accurate setting of the Mach-Zehnder modulator DC bias points and of the alignment of the RZ modulation to the data modulation are necessary to achieve a RZ-DPSK modulated signal that results in optimal system BER. In the illustrated exemplary embodiment, the modulator bias points and the alignment of the RZ modulation to the data modulation are established and controlled by a bias and phase controller 234. The controller 234 provides an RZ Bias output 236 to establish the DC bias of the RZ modulator 204, an NRZ Bias output 238 to establish the DC bias of the NRZ modulator 206, and a Phase Bias output 240 to the Phase Bias input 222 of the phase shifter to establish timing alignment between the RZ 204 and NRZ 206 modulators.

As is known, optical power from the two arms of a Mach-Zehnder modulator is coupled to the output of the modulator Y-branch as the modulator output. Optical power from the two arms is also scattered/radiated at or near the Y-branch coupler and does not appear at the modulator output. As used, herein "scattered light" and "light scattered" at the output of a modulator, or by a modulator, shall refer to the optical power from the two arms of a modulator that is scattered/radiated at or near the modulator Y-branch coupler.

In general, the controller bias outputs are established by the controller 234 in response to changes of the average power in the scattered light at the output of the NRZ modulator 206 when dithering the modulator bias settings. The controller 234 amplifies, low pass filters and samples the current generated by a photodetector 242, e.g. a photodiode, and mixes these samples separately with each dither signal to obtain an error value representing the energy in the photodetector current at each of the dither frequencies. The presence of energy at a particular dither frequency indicates that its associated bias voltage is not optimum. The error values are used to establish new associated bias settings. Optimum bias settings may be achieved by minimizing the associated error values.

In the illustrated exemplary embodiment, the average power in the light scattered by the NRZ modulator 206 is derived from the output of the photodetector 242, which is positioned in close proximity to the modulator Y-branch for detection of at least a portion of the light scattered at the output of the NRZ modulator. In one embodiment, the photodetector 242 may be integrated into the dual-stage modulator package It has been recognized that use of a photodetector which monitors the light transmitted by the modulator, as opposed to the scattered light, can cause the RZ bias control loop to fail at a specific RZ modulation depths. Using a scattered light photo-detector 242 reduces or eliminates this problem since a much different pulse shape is imparted to the detector.

Figure 3:
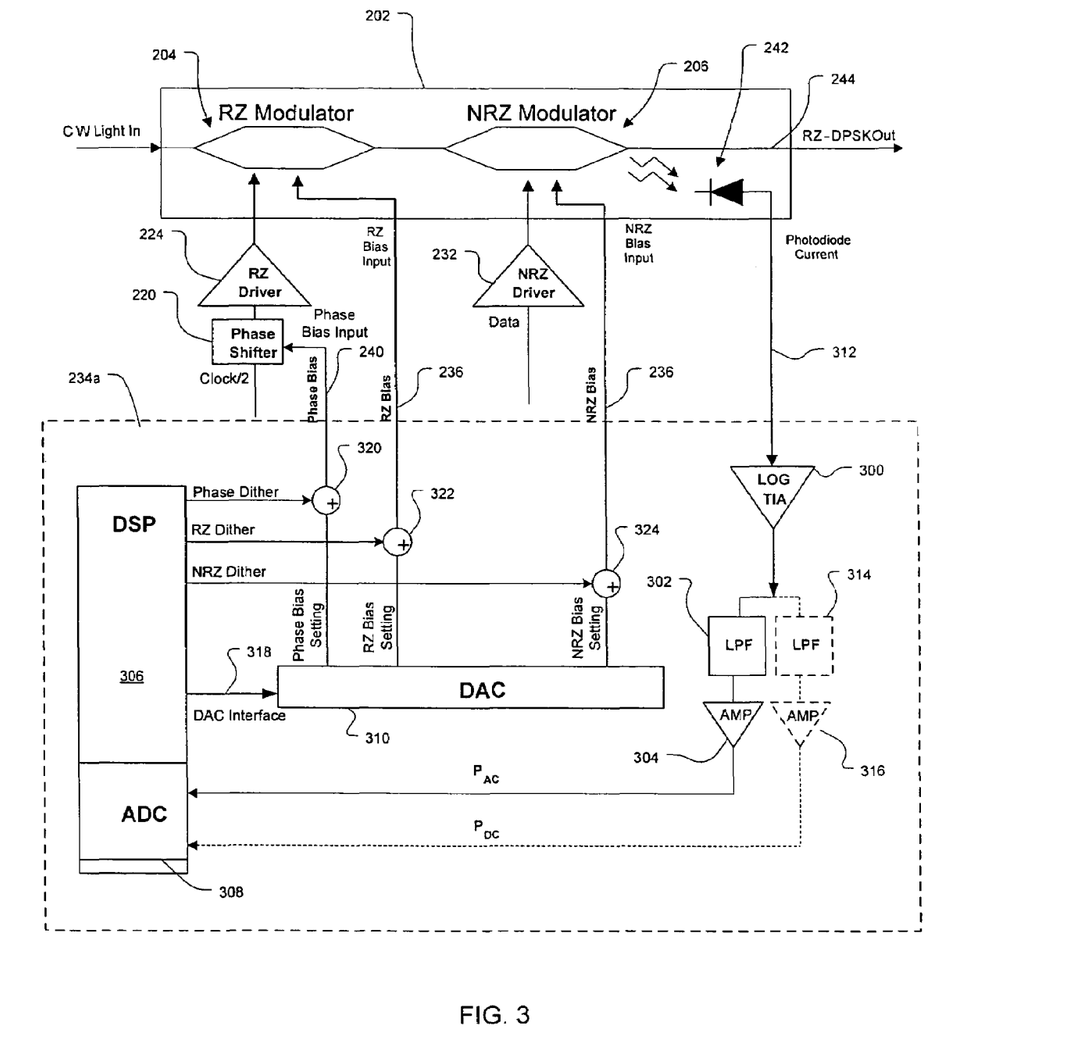
FIG. 3 is a simplified block diagram of a system consistent with the present invention including an exemplary controller consistent with the present invention.

FIG. 3 illustrates an exemplary embodiment of a bias and phase (modulation alignment) controller 234a consistent with the invention coupled to a dual stage modulator 202. In operation, the controller 234a establishes initial bias settings, Phase Bias Setting, RZ Bias Setting, and NRZ Bias Setting, and applies low frequency dither signals Phase Dither, RZ Dither, NRZ Dither, respectively, to the settings. The Phase Bias Setting is added to the Phase Dither signal and provided to the phase shifter as the Phase Bias output 240 of the controller for aligning the relative phase of the RZ modulator 204 to the NRZ modulator 206. The RZ Bias Setting is added to the RZ Dither signal and provided to the RZ modulator 204 as the RZ Bias output 236 of the controller for setting the RZ modulator bias point, and the NRZ Bias Setting is added to the NRZ Dither signal and is provided as a NRZ output 238 of the controller to the NRZ modulator 206 for setting the NRZ modulator bias point. The controller 234a adjusts the bias settings, Phase Bias Setting, RZ Bias Setting, and a NRZ Bias Setting, in response to associated error values derived from comparing the average power in the light scattered by the NRZ modulator 206 with the dither signals.

The illustrated exemplary controller 234a generally includes an amplifier 300, a low pass filter (LPF) 302 and amplifier 304 coupled to the output of the amplifier 300, a digital signal processor (DSP) 306 including an analog-to-digital converter (ADC) 308, and a digital-to-analog converter (DAC) 310. As shown, the current output 312 of the scattered photodetector 242 may be coupled to the amplifier 300. A variety of amplifier configurations are known to those of ordinary skill in the art. In one embodiment, the amplifier 300 may be configured as a logarithmic trans-impedance amplifier. A logarithmic trans-impedance amplifier allows the ADC and associated circuitry to operate correctly over a wide dynamic range of monitored photocurrents.

The output of the amplifier 300 may be provided to the low pass filter (LPF) 302 and amplifier 304 configured to output an analog signal $P_{AC}$ containing dither signals recovered by the photodetector 242, plus their harmonics and noise. In an embodiment wherein the amplifier 300 is configured as a linear amplifier, the output of the amplifier 300 may be provided to a second low pass filter 314 and amplifier 316 configured to provide an analog signal $P_{DC}$, representative of the DC content of the monitored photocurrent. The $P_{DC}$ signal may be digitized by the ADC 308, and sampled by the DSP 306, e.g. only once for each iteration of the control loop, to achieve a value representative of the average power. The average power value derived from $P_{DC}$ may be used to normalize the error values to ensure that the error values increase only when the associated bias setting moves in the wrong direction.

The digitized $P_{AC}$ signal is sampled by the DSP 306. To simplify processing, the sampling may be conducted synchronously with the generation of the three dither signals Phase Dither, RZ Dither, NRZ dither. The $P_{AC}$ samples are mixed (i.e. multiplied) with each of the three generated dither tones Phase Dither, RZ Dither, NRZ dither. The result of each mixing is a signed error value which represents an error associated with each bias setting, e.g. mixing of Phase Dither with the samples produces an error value representing error in the Phase Bias Setting, mixing of RZ Dither with the samples produces an error value representing error in the RZ Bias Setting, and mixing of NRZ Dither produces an error value representing error in the NRZ Bias Setting.

Each of the signed error values may be coupled to a separate associated proportional-integral-differential controller (PID). Each PID may calculate new values for an associated one of the bias settings. The PID controllers may be implemented in the DSP 306, e.g. in software, hardware or a combination thereof. The DSP 306 may provide the new control setting values via a DAC interface 318 to the DAC 310, e.g. an SPI bus, which produces the new bias settings. The new bias settings, Phase Bias Setting, RZ Bias Setting, and NRZ Bias Setting provided by the DAC 310 may be added to their associated dither signals, Phase Dither, RZ Dither, NRZ dither, respectively, e.g. by adders 320, 322, 324 and coupled to the phase bias port of the phase shifter, the bias port of the RZ modulator, and the bias port of the NRZ modulator, respectively.

Figure 4:
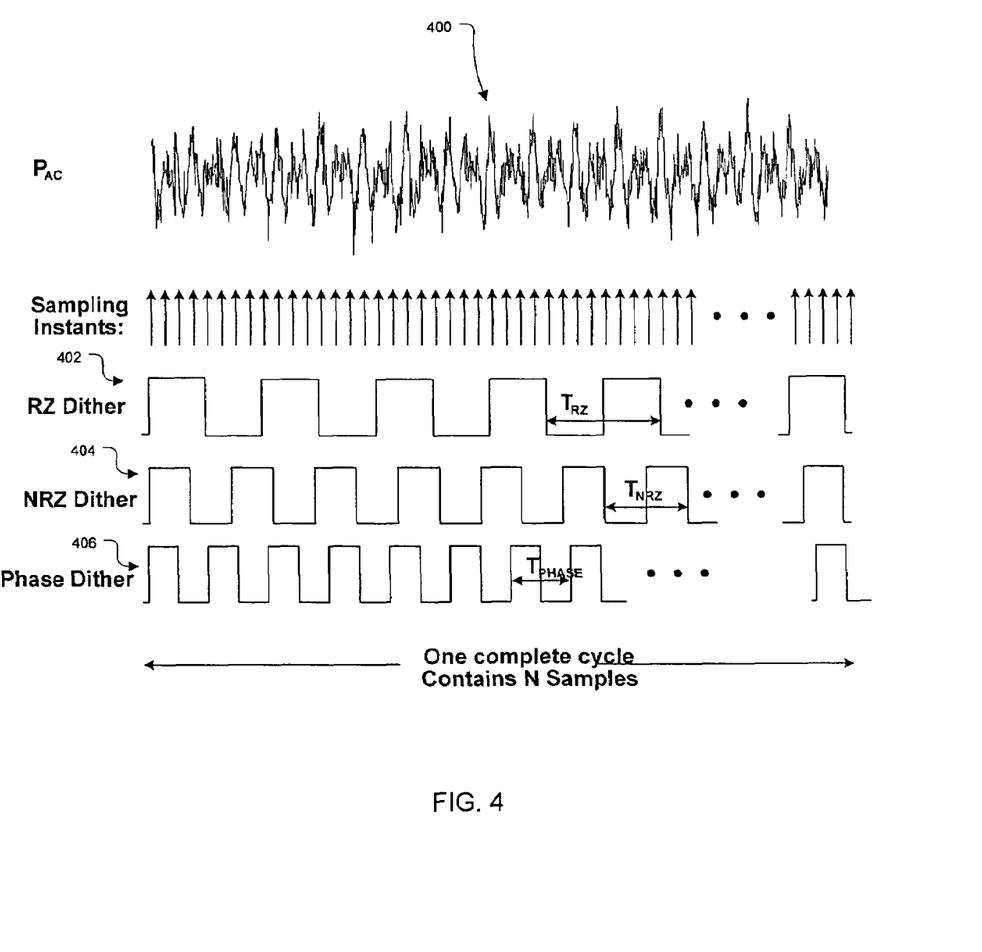
FIG. 4 is a timing diagram showing exemplary waveforms associated with an exemplary transmitter consistent with the invention.

FIG. 4 is a timing diagram showing exemplary $P_{AC}$, RZ Dither, NRZ Dither, Phase Dither and sampling instants associated with an exemplary bias and phase controller consistent with the present invention. In a controller consistent with the present invention, the dither signals may be low frequency signals. As used herein, the term "low frequency" refers to a frequency that is at least an order of magnitude (i.e. a factor of 10) less than the modulator data rate. The term "low speed", as used herein, refers to a device having an operating bandwidth that is at least an order of magnitude (i.e. a factor of 10) less than the modulator data rate. Use of low frequency dither signals, allows use low frequency/low speed components, e.g. the scattered light photodetector 242, amplifier 300, LPF 302, ADC 308, DSP 306, DAC 310, etc. capable of manipulating and/or processing the dither signals. This reduces the cost and complexity of the system compared to high frequency (bandwidth on the order of the data rate) designs.

The $P_{AC}$ signal 400 shown in FIG. 4 is an analog signal. $P_{AC}$ is digitized by the ADC 308 and sampled N times by the DSP 306 for each iteration of the control loop. In one embodiment, a 60 KHz sampling frequency may be used to provide 60 samples (N=60) for each iteration of the control loop. The $P_{AC}$ samples are multiplied, separately, by the RZ Dither 402, NRZ dither 404 and Phase Dither 406 signals to obtain separate error values associated with the RZ bias, NRZ bias, and Phase bias, respectively.

To avoid interference between the RZ Bias, NRZ Bias and Phase Bias control loops, each dither signal may have a different frequency. In an embodiment including a 60 kHz sampling frequency, the RZ dither frequency may be about 5 kHz, the NRZ dither frequency may be about 3 kHz, and the Phase dither frequency may be about 2 kHz. Those of ordinary skill in the art will recognize that a variety of other sampling and dither frequencies may be provided. To avoid interference between the dither frequencies, however, the dither frequencies may be established such the no dither frequency is an integer multiple of any other dither frequency, and the period, $T_{RZ}$, $T_{NRZ}$, $T_{Phase}$, respectively, of the dither signals are a factor of N.

In addition, to simplify the controller the phase of the dither signals may be optimized with respect to the digitized $P_{AC}$ signal. The controller may be configured, e.g. through software, hardware or a combination of software and hardware, to allow for deterministic low frequency phase differences between the dither signals and the digitized $P_{AC}$ signal. The optimal phase value for each dither signal may be determined by purposefully misadjusting the bias signals and measuring the error values as a function of the phase value. The phase value may be set for each loop at a value that minimizes the error value.

Figure 5:
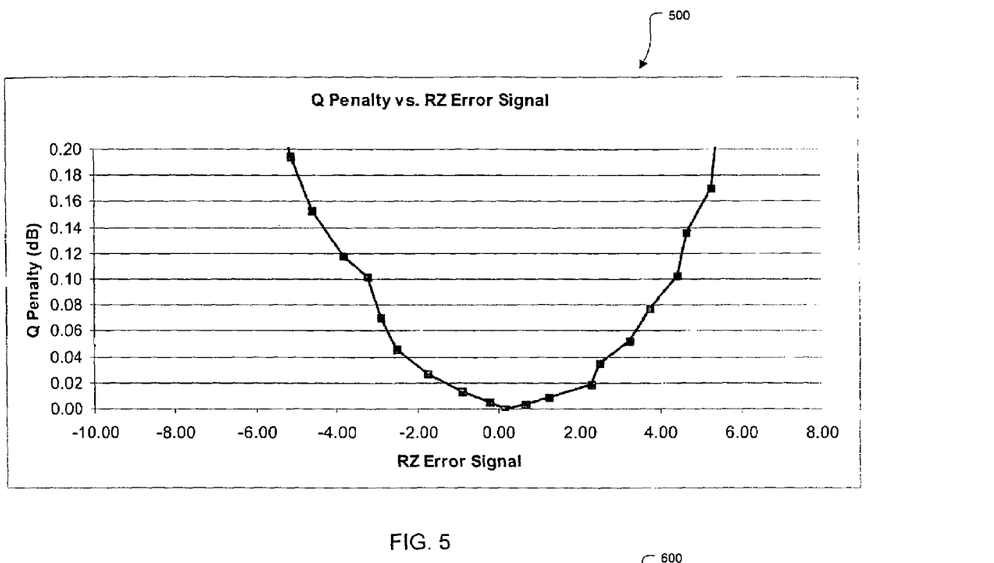
FIG. 5 shows plots of Q penalty vs. RZ error signal established by a controller consistent with the invention.
Figure 6:
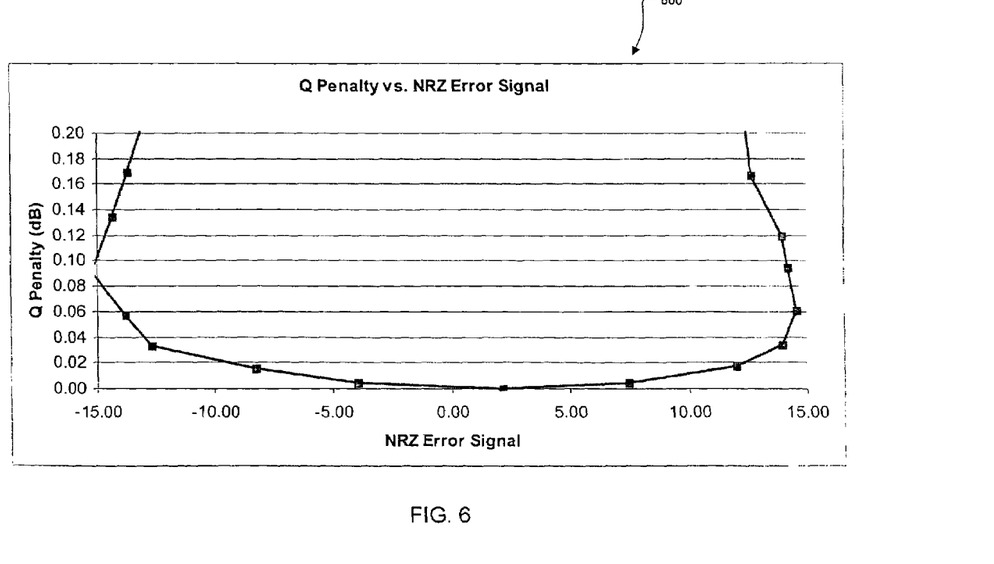
FIG. 6 shows plots of Q penalty vs. NRZ error signal established by a controller consistent with the invention.
Figure 7:
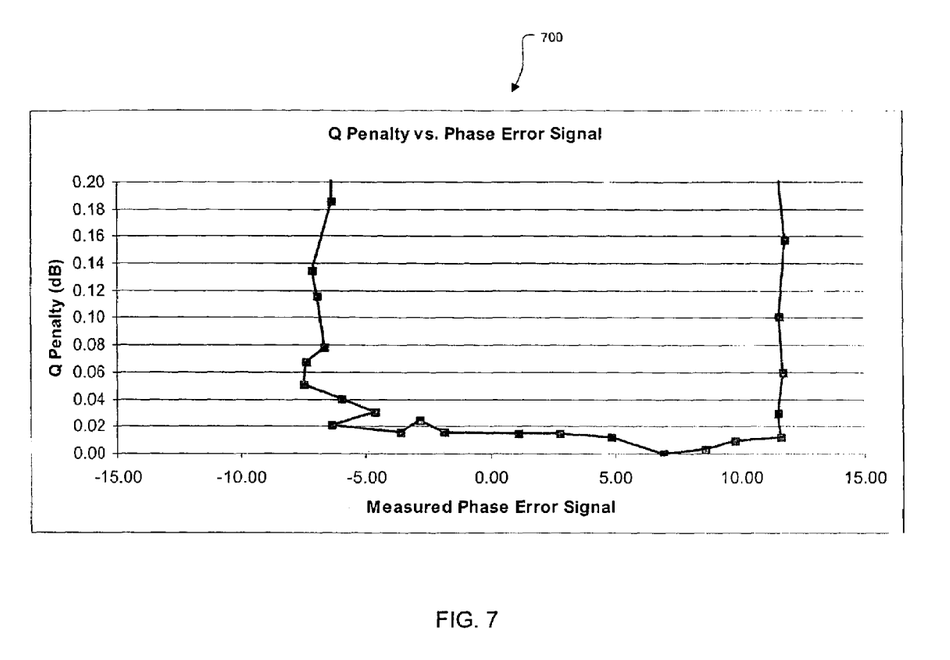
FIG. 7 shows plots of Q penalty vs. Phase error signal established by a controller consistent with the invention.

Consistent with the present invention, the optimal setting for the RZ bias, NRZ bias and Phase bias signals may be achieved by minimizing the associated signed error values. FIGS. 5-7, for example, illustrate the Q penalty vs. error signal value associated with one exemplary controller consistent with the invention wherein the RZ pulse width is characterized by a carrier-to-side-band ratio (CSR) of 7.5 dB. The illustrated Q penalty represents the decrease in Q associated with incorrect biasing compared to the Q achieved with optimal biasing, i.e. a Q penalty of 0 dB represents optimal biasing. FIG. 5 includes a plot 500 of Q penalty vs. the RZ error signal value established by the controller. FIG. 6 includes a plot 600 of Q penalty vs. the NRZ error signal value established by the controller. FIG. 7 includes a plot 700 of Q penalty vs. the Phase error signal value established by the controller. As shown, for a CSR of 7.5 dB the Q penalty associated with the modulator bias settings is below about 0.02 dB when the error signals values are minimized, e.g. approximately zero.

Those of ordinary skill in the art will recognize numerous methods of minimizing the error signal values to achieve optimum bias settings. In one embodiment, for example, the error signal values may be minimized by perturbing the bias settings to achieve a minimum error. A new bias setting may be calculated and written to the DAC in response to each signed error value. The sign (±) of the error value may establish a direction of change in the associated bias signal. The bias may be changed in any increment. Smaller incremental changes in the bias lead to increased bias resolution and accuracy. In one embodiment, the bias may be changed by a constant multiple of the error value. The optimum bias may be achieved when the same change in the associated average power is achieved when the bias is changed in one direction and then back to the optimum as is achieved when the bias is changed in the opposite direction and then back to the optimum. When the optimum bias is achieved the average power no longer contains a spectral component at the fundamental of the associated dither frequency. The average power may still contain spectral components at harmonics of the dither frequency.

Figure 8:
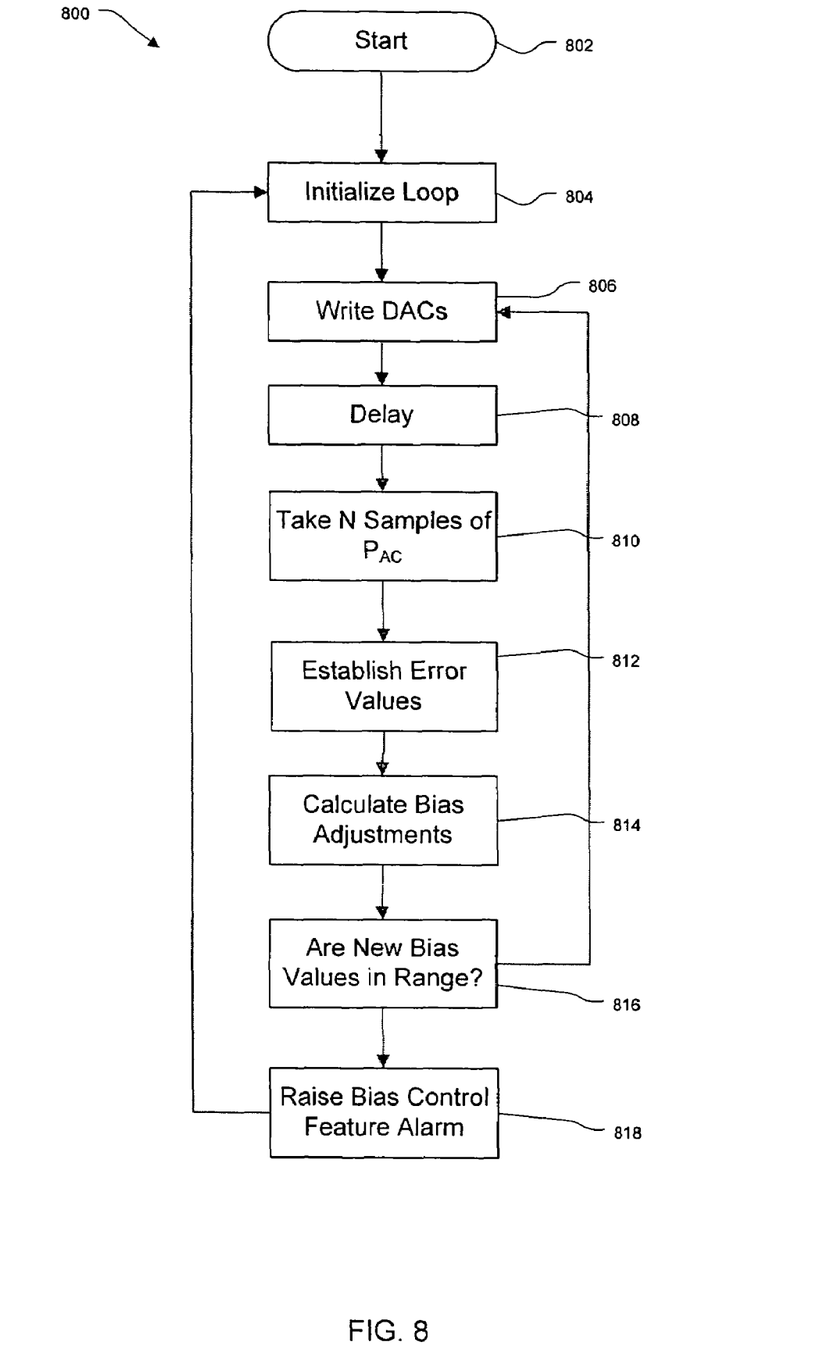
FIG. 8 is a block flow diagram illustrating an exemplary alarm bias and alignment control process performed by a controller consistent with the present invention.

FIG. 8 is a block flow diagram of one example of a bias and alignment control process 800 performed by a controller consistent with the present invention. The block flow diagram is illustrated with a particular sequences of steps. It can be appreciated, however, that the sequence of steps merely provides an example of how the general functionality described herein can be implemented. Further, each sequence of steps does not have to be executed in the order presented unless otherwise indicated.

In the exemplary embodiment illustrated in FIG. 8, the process starts 802 with initializing 804 each bias control loop. The initialization may include setting the RZ Bias Setting, NRZ Bias Setting and Phase Bias Setting values to levels located at the middle of the bias ranges, and activating the RZ Dither, NRZ Dither, and Phase Dither signals. The RZ Bias Setting, NRZ Bias Setting and Phase Bias Setting may be written to the DAC 806. A delay 808 may be provided to allow the bias settings to settle into the DAC analog circuitry and appear at the DAC output for addition to the dither signals.

Once the initial bias signals and dither signals are added and provided at the associated ports of the RZ modulator, NRZ modulator and phase shifter, N samples of the PAC signal may be taken 810 by the DSP. The samples may be mixed with the dither signals to establish the error values 812, and bias adjustments may be calculated 814 from the error values. If the adjusted bias signals are within a predetermined expected range 816, they may be written to the DACS 806 and flow may continue. Otherwise, a bias control alarm may be set 818 and flow may return to the initialization step 804.

There is thus provided a method and apparatus for bias and alignment control in a RZ-DPSK transmitter that provides stable, accurate, and efficient bias and alignment control. In one exemplary embodiment, the apparatus includes a dual-stage Mach-Zehnder modulator for modulating data on an optical signal with a modulation format having a periodic intensity modulation and a DPSK data modulation. The modulator may include a Mach-Zehnder RZ modulator for imparting the periodic intensity modulation in response to a RZ bias signal, and a Mach-Zehnder NRZ modulator for imparting the DPSK data modulation in response to a NRZ bias signal. A phase shifter may be provided for selectively aligning the periodic intensity modulation and the data modulation in response to a phase bias signal. A low speed photo-detector may be configured to detect scattered light at the output of the modulator. The low speed photo-detector may have a bandwidth of at least one order of magnitude less than a data rate of the data and be configured to provide an output representative of power scattered by the NRZ modulator. A controller may provide at least one of the RZ bias signal, the NRZ bias signal, or the phase bias signal, in response to the output of the low speed photodetector.

The embodiments that have been described herein but some of the several which utilize this invention and are set forth here by way of illustration but not of limitation. Many other embodiments, which will be readily apparent to those skilled in the art, may be made without departing materially from the spirit and scope of the invention.

What is claimed is:

1. An apparatus for transmitting an optical signal, said apparatus comprising:

a modulator for modulating data on an optical signal with a modulation format having a periodic intensity modulation and a differential phase shift keying (DPSK) data modulation, said modulator comprising a Mach-Zehnder RZ modulator for imparting said periodic intensity modulation in response to a RZ bias signal, and a Mach-Zehnder NRZ modulator for imparting said DPSK data modulation in response to a NRZ bias signal;

a phase shifter for selectively aligning said periodic intensity modulation and said data modulation in response to a phase bias signal;

a low speed photo-detector, said low speed photo-detector having a bandwidth of at least one order of magnitude less than a data rate of said data and being configured to detect light scattered at an output of said NRZ modulator and provide an output representative of power in said light scattered at said output of said NRZ modulator; and a controller for providing at least one of said RZ bias signal, said NRZ bias signal, or said phase bias signal, in response to said output of said low speed photodetector.

2. An apparatus according to claim 1, wherein said controller is configured for providing said phase bias signal in response to said output of said low speed photodetector.

3. An apparatus according to claim 1, wherein said controller is configured for providing said RZ bias signal in response to said output of said low speed photodetector.

4. An apparatus according to claim 1, wherein said controller is configured for providing said RZ bias signal and said NRZ bias signal in response to said output of said low speed photodetector.

5. An apparatus according to claim 1, wherein said controller is configured for providing each of said RZ bias signal, said NRZ bias signal, and said phase bias signal in response to said output of said low speed photodetector.

6. An apparatus according to claim 1, wherein said periodic intensity modulation is a return-to-zero (RZ) intensity modulation.

7. An apparatus according to claim 1, wherein an input of said Mach-Zehnder NRZ modulator is coupled to an output of said Mach-Zehnder RZ modulator, and wherein an output of said Mach-Zehnder NRZ modulator is provided as said output of said modulator.

8. An apparatus according to claim 1, wherein said phase shifter is coupled to said Mach-Zehnder RZ modulator for selectively aligning said periodic intensity modulation with said data modulation.

9. An apparatus according to claim 1, wherein said phase shifter comprises an electrical variable delay circuit.

10. An apparatus according to claim 1, wherein said controller is configured for providing said phase bias signal in response to said output of said low speed photodetector, and wherein said phase bias signal comprises a low frequency phase bias dither, said low frequency phase bias dither having a frequency at least one order of magnitude less than said data rate.

11. An apparatus according to claim 10, wherein said controller provides said phase bias signal in response to a phase bias error value obtained by mixing a signal representative of said output of said photodetector with a signal representative of said phase bias dither.

12. An apparatus according to claim 11, wherein said controller is configured to adjust said phase bias signal to minimize said phase bias error value.

13. An apparatus according to claim 1, wherein said controller is configured for providing said RZ bias signal in response to said output of said low speed photodetector, and wherein said RZ bias signal comprises a low frequency RZ bias dither, said low frequency RZ bias dither having a frequency at least one order of magnitude less than said data rate.

14. An apparatus according to claim 13, wherein said controller provides said RZ bias signal in response to a RZ bias error value obtained by mixing a signal representative of said output of said photodetector with a signal representative of said RZ bias dither.

15. An apparatus according to claim 14, wherein said controller is configured to adjust said RZ bias signal to minimize said RZ bias error value.

16. An apparatus according to claim 1, wherein said a controller is configured for providing said NRZ bias signal in response to said output of said low speed photodetector, and wherein said NRZ bias signal comprises a low frequency NRZ bias dither, said low frequency NRZ bias dither having a frequency at least one order of magnitude less than said data rate.

17. An apparatus according to claim 16, wherein said controller provides said NRZ bias signal in response to a NRZ bias error value obtained by mixing a signal. representative of said output of said photodetector with a signal representative of said NRZ bias dither.

18. An apparatus according to claim 17, wherein said controller is configured to adjust said NRZ bias signal to minimize said NRZ bias error value.

19. An apparatus for transmitting an optical signal, said apparatus comprising:

a modulator for modulating data on an optical signal with a modulation format having a periodic intensity modulation and a differential phase shift keying (DPSK) data modulation, said modulator comprising a Mach-Zehnder RZ modulator for imparting said periodic intensity modulation in response to a RZ bias signal, and a Mach-Zehnder NRZ modulator for imparting said DPSK data modulation in response to a NRZ bias signal;

a phase shifter for selectively aligning said periodic intensity modulation and said data modulation in response to a phase bias signal;

a low speed photo-detector, said low speed photo-detector having a bandwidth of at least one order of magnitude less than a data rate of said data and being configured to detect light scattered at an output of said NRZ modulator and provide an output representative of power in said light scattered at said output of said NRZ modulator; and a controller for providing said RZ bias signal, said NRZ bias signal, and said phase bias signal in response to said output of said low speed photodetector, said RZ bias signal comprising a low frequency RZ bias dither, said NRZ bias signal comprising a low frequency NRZ bias dither, and said phase bias signal comprising a low frequency phase bias dither, each of said RZ bias dither, said NRZ bias dither, and said phase bias dither having an associated frequency at least one order of magnitude less than said data rate, said controller being configured to provide said RZ bias signal in response to a RZ bias error value obtained by mixing a signal representative of said output of said photodetector with a signal representative of said RZ bias dither, said controller being configured to provide said NRZ bias signal in response to a NRZ bias error value obtained by mixing said signal representative of said output of said photodetector with a signal representative of said NRZ bias dither, and said controller being configured to provide said phase bias signal in response to a phase bias error value obtained by mixing said signal representative of said output of said photodetector with a signal representative of said phase bias dither.

20. An apparatus according to claim 19, wherein said periodic intensity modulation is a return-to-zero (RZ) intensity modulation.

21. An apparatus according to claim 19, wherein an input of said Mach-Zehnder NRZ modulator is coupled to an output of said Mach-Zehnder RZ modulator, and wherein an output of said Mach-Zehnder NRZ modulator is provided as said output of said modulator.

22. An apparatus according to claim 19, wherein said phase shifter is coupled to said Mach-Zehnder RZ modulator for selectively aligning said periodic intensity modulation with said data modulation.

23. An apparatus according to claim 19, wherein said phase shifter comprises an electrical variable delay circuit.

24. An apparatus according to claim 19, wherein said controller is configured to adjust said phase bias signal to minimize said phase bias error value.

25. An apparatus according to claim 19, wherein said controller is configured to adjust said RZ bias signal to minimize said RZ bias error value.

26. An apparatus according to claim 19, wherein said controller is configured to adjust said NRZ bias signal to minimize said NRZ bias error value.

27. An apparatus according to claim 19, wherein said associated frequencies of said RZ bias dither, said NRZ bias dither, and said phase bias dither are different from each other.

28. An apparatus according to claim 27, wherein said associated frequencies are not integer multiples of each other.

29. A method of operating a modulator for modulating data on an optical signal with a modulation format having a periodic intensity modulation and a differential phase shift keying (DPSK) data modulation, said modulator comprising a Mach-Zehnder RZ modulator for imparting said periodic intensity modulation in response to a RZ bias signal, and a Mach-Zehnder NRZ modulator for imparting said DPSK data modulation in response to a NRZ bias signal, and having a phase shifter coupled thereto for selectively aligning said periodic intensity modulation and said data modulation in response to a phase bias signal, said method comprising:
   detecting power in light scattered at an output of said modulator using a low speed photo-detector, said low speed photo-detector having a bandwidth of at least one order of magnitude less than a data rate of said data and being configured to provide an output representative of power at said output of said modulator; and
   providing at least one of said phase bias signal, said RZ bias signal, or said NRZ bias signal in response to said output of said low speed photodetector.

30. A method according to claim 29, said method comprising providing said phase bias signal in response to said output of said low speed photodetector.

31. A method according to claim 29, said method comprising providing said RZ bias signal in response to said output of said low speed photodetector.

32. A method according to claim 29, said method comprising providing said RZ bias signal and said NRZ bias signal in response to said output of said low speed photodetector.

33. A method according to claim 29, said method comprising providing each of said RZ bias signal, said NRZ bias signal, and said phase bias signal in response to said output of said low speed photodetector.

34. A method according to claim 29, said method comprising providing said phase bias signal in response to said output of said low speed photodetector, and wherein said phase bias signal comprises a low frequency phase bias dither, said low frequency phase bias dither having a frequency at least one order of magnitude less than said data rate.

35. A method according to claim 34, said method comprising providing said phase bias signal in response to a phase bias error value obtained by mixing a signal representative of said output of said photodetector with a signal representative of said phase bias dither.

36. A method according to claim 35, said method further comprising adjusting said phase bias signal to minimize said phase bias error value.

37. A method according to claim 29, said method comprising providing said RZ bias signal in response to said output of said low speed photodetector, and wherein said RZ bias signal comprises a low frequency RZ bias dither, said low frequency RZ bias dither having a frequency at least one order of magnitude less than said data rate.

38. A method according to claim 37, said method comprising providing said RZ bias signal in response to a RZ bias error value obtained by mixing a signal representative of said output of said photodetector with a signal representative of said RZ bias dither.

39. A method according to claim 38, said method further comprising adjusting said RZ bias signal to minimize said RZ bias error value.

40. A method according to claim 29, said method comprising providing said NRZ bias signal in response to said output of said low speed photodetector, and wherein said NRZ bias signal comprises a low frequency NRZ bias dither, said low frequency NRZ bias dither having a frequency at least one order of magnitude less than said data rate.

41. A method according to claim 40, said method comprising providing said NRZ bias signal in response to a NRZ bias error value obtained by mixing a signal representative of said output of said photodetector with a signal representative of said NRZ bias dither.

42. A method according to claim 41, said method further comprising adjusting said NRZ bias signal to minimize said NRZ bias error value.

* * * * *